United States Patent [19]

Bopp

[11] Patent Number: 4,505,365
[45] Date of Patent: Mar. 19, 1985

[54] VISCOUS BYPASS COUPLING FOR TORQUE CONVERTER

[75] Inventor: Warren G. Bopp, Farmington Hills, Mich.

[73] Assignee: Eaton Corporation, Cleveland, Ohio

[21] Appl. No.: 499,616

[22] Filed: May 31, 1983

[51] Int. Cl.³ .............................................. F16D 47/06
[52] U.S. Cl. .................................. 192/3.29; 192/58 B; 192/109 F
[58] Field of Search ................. 192/3.28, 3.27, 3.29, 192/3.3, 3.31, 48.1, 101, 58 A, 58 B, 58 C, 48.3, 106.1, 106.2, 109 F

[56] References Cited

U.S. PATENT DOCUMENTS

| | | | |
|---|---|---|---|
| 3,625,325 | 12/1971 | Hersey | 192/58 C |
| 3,972,399 | 8/1976 | Bopp | 192/58 B |
| 4,064,980 | 12/1977 | Tinholt | 192/58 B |
| 4,181,203 | 1/1980 | Malloy | 192/3.3 |
| 4,317,510 | 3/1982 | Staub | 192/3.29 |
| 4,423,803 | 1/1984 | Malloy | 192/101 X |

Primary Examiner—George H. Krizmanich
Attorney, Agent, or Firm—C. H. Grace; P. S. Rulon

[57] ABSTRACT

A bypass drive line (27) for a torque converter type automatic transmission (11) in which the bypass drive line includes a viscous coupling (30). The viscous coupling is of a sandwich construction including an annular body member (32) formed of aluminum, an annular cover member (34) of steel secured at its outer periphery (34a) to the outer peripheral portion (32a) of the body member and radially inwardly thereof spaced axially from the body member to define a viscous fluid chamber therebetween, and an annular clutch member (36a) disposed in the chamber and having a central hub portion (36e) adapted to be drivingly connected to the output shaft (16) of the torque converter. Confronting portions (36e, 32f) and (36c, 36d) of the body and clutch members define closely spaced working area, for viscously transmitting force from the body member to the clutch member. The drive into the coupling from the housing (22) of the torque converter is through an annular steel clutching surface (34f) defined on the side face of the radially outer peripheral portion of the cover member. The body member includes a central hub portion (32d) which is journaled on the central hub portion of the clutch member and the radially inner periphery (34d) of the cover member is sealed to the clutch member in non load-bearing relation so that the entire radial loading of the body member and cover member are carried at the journal between the hub portion of the body member and the clutch member. And a thrust arrangement (42) is provided on the extension of the coupling having thrust washers 44, 48 which react axial forces at a position radially outward of the journal inhibit cocking of the body hub on the clutch hub.

10 Claims, 3 Drawing Figures

VISCOUS BYPASS COUPLING FOR TORQUE CONVERTER

BACKGROUND OF THE INVENTION

This invention relates to viscous couplings. More particularly, it relates to such couplings employed in automatic fluid coupling or torque converter transmissions to selectively bypass the torque converter.

Torque converter type automatic transmissions have achieved almost universal application and acceptance in motor vehicles. While generally satisfactory in this application, torque converter automatic transmissions embody inherent slip and therefore incorporate inherent losses in vehicular fuel economy. In an effort to minimize this slippage and thereby optimize fuel economy, various efforts have been made to bypass the torque converter with some manner of direct drive which is typically brought into play when the vehicle is operating in the higher gear ratios and above a predetermined vehicular speed. While these direct drive bypass arrangements have resulted in improvements in fuel economy, they have also, under certain conditions, served to transmit various drive line vibrations to the passenger compartment of the motor vehicle, resulting in a derogation in the ride quality of the vehicle. In an effort to provide a bypass arrangement that would not transmit drive line vibrations to the passenger compartment, it has been proposed that a viscous coupling be employed in the bypass drivetrain. While the use of a viscous coupling in the bypass drivetrain does serve to minimize transmission of drive line vibrations to the passenger compartment, it is imperative that the coupling be designed for maximum efficiency so that losses in the coupling itself cannot significantly offset the fuel economy gains achieved by the use of the bypass.

Further, since viscous couplings transmit torque across closely spaced internal surfaces via a viscous fluid, it is not only imperative that the spacing between the surfaces be uniform from one coupling to another but that such spacing be maintained while the coupling is in use. When viscous couplings are employed in bypass drivetrains, they are or may be subjected to relatively high axial loads which tend to distort their housings, thereby changing the spacing between the surfaces. Additionally, nonuniform axial loads on the housings tend to cock the housings and cause metal-to-metal contact of the internal surfaces, thereby causing dramatic derogation of the couplings performance and premature failure.

Viscous couplings employed in automatic torque converter transmissions to selectively bypass the torque converter must transmit relatively high torques and therefoe must have large viscous sheer surfaces, must be relatively compact to fit within the housing of the torque converter, must be manufacturable at reasonable and competitive cost, must exhibit uniform torque transmitting capacities from coupling-to-coupling, and must be durable. Accordingly, the viscous coupling disclosed herein is formed with an annular housing having an annular radially extending body member formed preferably as an aluminum casting, an annular radially extending cover member formed as a ferrous sheet metal stamping, a clutch member formed as a permanent mold casting disposed in a chamber defined by the housing. The body member includes an axially extending hub portion having an inner peripheral surface and the clutch member includes an axially extending hub portion having an outer peripheral surface on which the inner peripheral surface of the hub portion of the body member is journaled. The hub provides the sole radial and axial load support for the housing. And an outer peripheral portion of the steel cover member, fixed to an outer peripheral portion of the body member, defines an annular axially facing friction surface for clutching coaction with a confronting friction surface defined by the torque converter housing.

SUMMARY OF THE INVENTION

Accordingly, it is the object of the present invention to provide simple and efficient viscous couplings for use as bypass elements in torque converter transmissions and which are compact, lightweight, inexpensive, and durable.

The torque converter viscous bypass coupling of the present invention is of the type including an annular body member, an annular cover member coacting with the body member to define an annular chamber for receiving a viscous fluid, and an annular clutch member disposed within the chamber in viscous driving relation to the body member and having a hub portion adapted to be drivingly connected to the output shaft of the torque converter.

According to one feature of the invention, the body member is formed of aluminum and has a central hub portion which is journaled on the central hub portion of the clutch member, the cover member is formed from a lightweight ferrous sheet metal stamping and is sealed adjacent its radially inner edge to the clutch member but is nonload-bearing so that the entire radial and thrust loading of the body member and cover member is absorbed at the hub portions of the body and clutch members, and an outer peripheral surface of the steel cover member defines an annular axially facing friction surface for clutching coaction with a confronting friction surface defined by the torque converter housing. This arrangement provides a lightweight, inexpensive, and compact coupling with good heat transfer, and negates the need for bonding a friction material to the body member to protect the aluminum of the body member from wear and abrasion.

According to another feature of the invention, outer peripheral portions of the body and cover members are fixed together by metal rollover, and circumferential slippage of the members is prevented by projections from one member into recesses in the other member.

These and other objects, features, and advantages of the invention will become apparent from the following Detailed Description of the Preferred Embodiment of the invention.

BRIEF DESCRIPTION OF THE DRAWINGS

FIG. 3 is a fragmentary end view looking along line 3—3 of FIG. 2.

DETAILED DESCRIPTION OF THE PREFERRED EMBODIMENT

Figure 1:
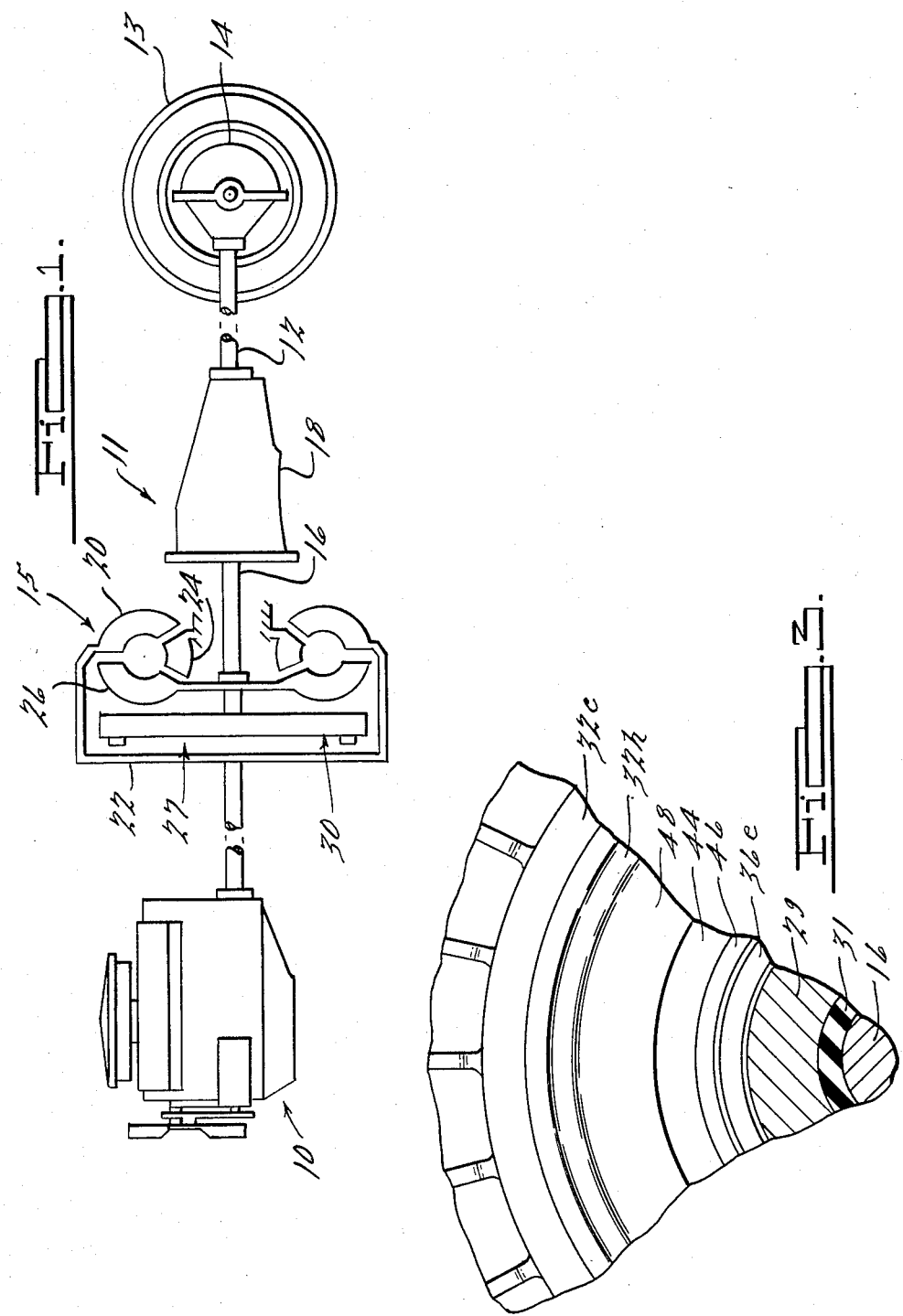
FIG. 1 is a schematic view of a motor vehicle drivetrain including a torque converter type automatic transmission employing a torque converter bypass drive embodying a viscous coupling.

The motor vehicle drivetrain seen schematically in FIG. 1 includes an internal combustion engine 10, an automatic transmission 11 and a propeller shaft 12 driving rear or front wheels 13 through a differential 14.

Transmission 11 includes a torque converter 15 having an output shaft 16 and a gear ratio box 18 driven by torque converter output shaft 16. Torque converter 15 is filled with automatic transmission fluid and includes, in known manner, a pump 20 driven from engine 10 through torque converter housing 22, a stator 24, and a turbine 26 driven hydrokinetically by pump 20. A fluid coupling may be employed in lieu of a torque converter.

Torque converter 15 further includes a bypass drive line seen generally at 27 in FIG. 1. Bypass drive line 27 is effective when actuated to provide a direct drive between torque converter housing 22 and torque converter output shaft 16 through a viscous coupling 30 thereby bypassing the high slippage drivepath through pump 20 and turbine 26.

Figure 2:
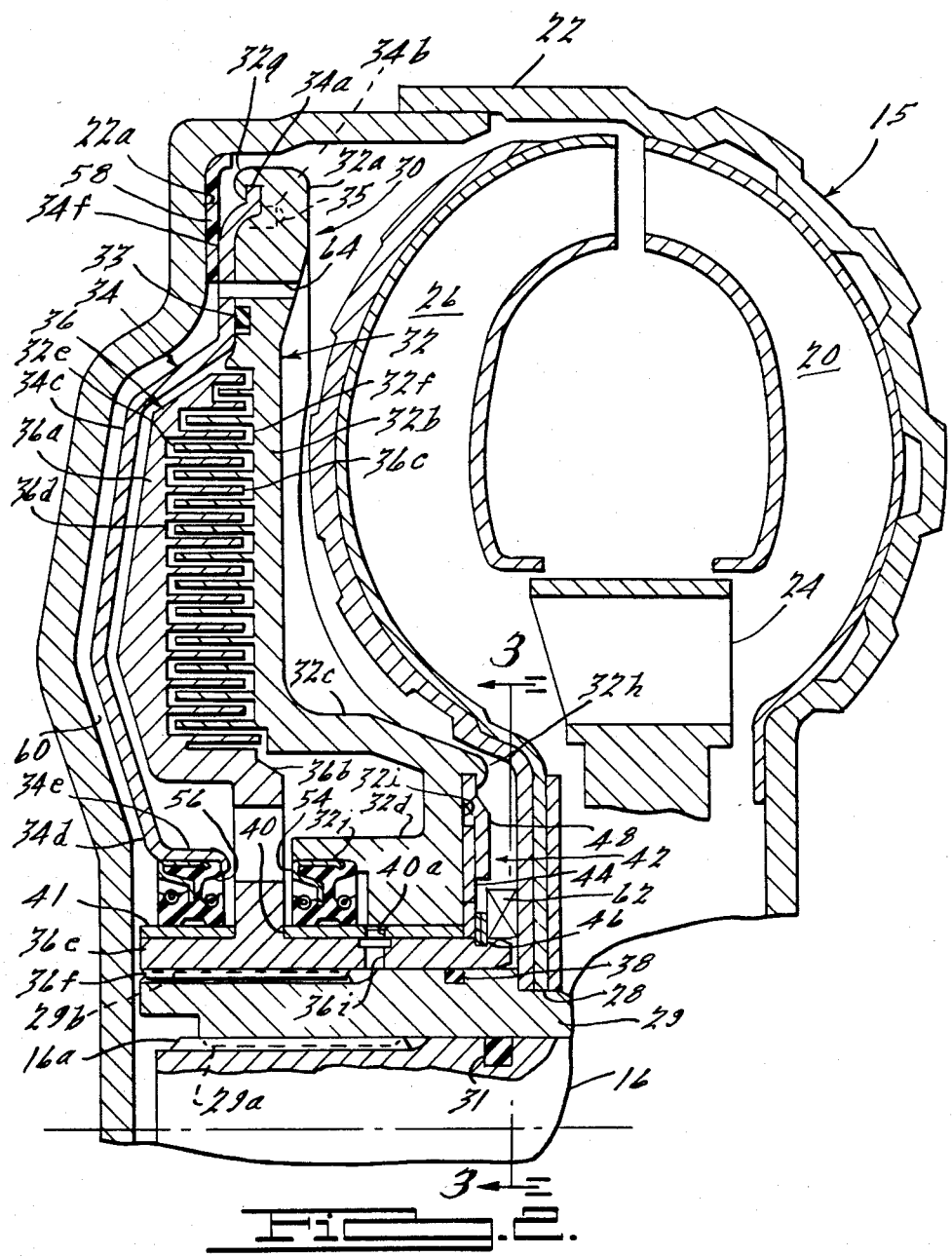
FIG. 2 is a fragmentary cross sectional view on an enlarged scale of the torque converter and viscous coupling bypass seen schematically in FIG. 1.

Turbine 26, as seen in FIG. 2, is secured by welding at 28 to an annular sleeve or mounting member 29. The inner periphery of the sleeve is splined at 29a for coaction with splines 16a on output shaft 16 to effect rotation of shaft 16 in response to rotation of turbine 26; a seal 31 prevents flow of transmission fluid along the interface of the sleeve and output shaft.

Viscous coupling 30 is generally circular and somewhat L-shaped in radial cross section. The coupling is of a sandwich construction and includes an annular housing assembly, adapted to be positioned within torque converter housing 22 of the torque converter and has axially spaced annular side wall members defining an annular clutch chamber therebetween, and an annular clutch member disposed within the clutch chamber. One side wall of the annular housing is constituted by a body member 32 and the other side wall member of the annular housing is constituted by a cover member 34. A clutch member 36 is interposed between body member 32 and cover member 34. Cover 34 is formed as a steel stamping and body member 32 and clutch member 36 are formed as aluminum castings.

Body 32 includes a radially outer peripheral portion 32a, an intermediate or working portion 32b, and a radially inner portion 32c terminating in a hub portion 32d extending axially leftwardly as viewed in FIG. 2 from the radially inner edge of inner portion 32c. Intermediate or working portion 32b is machined on its inner or left face, as viewed in FIG. 2, to form a series of annular axially extending rings 32e radially separated by a series of annular grooves 32f. A seal 33 is disposed in another annular groove machined in the inner face of body 32 radially outwardly of lands and grooves 32e, 32f.

Cover 34 includes a radially outer peripheral portion 34a held in a position seated against the inner or left face of body outer peripheral portion 32a by a rollover 32g on body 32, a plurality of tangs 34b received in blind bores or recesses 35 to prevent slippage of the cover relative to the body member, an intermediate portion 34c, and a radially inner portion 34d terminating in an inwardly, or rightwardly, turned lip portion 34e.

Intermediate portions 32b and 34c of the body and cover are configured to define the chamber which receives clutch assembly 36.

Clutch assembly 36 includes a working portion 36a and a mounting portion 36b. The side of working portion 36a confronting body 32 (the right side in FIG. 2) is machined to form a series of annular axially extending rings 36c separated by a series of annular grooves 36d. Rings 32e on body 32 are interdigitally arranged with respect to rings 36c on clutch 36. Mounting portion 36b includes an annular radially extending mounting flange or bridge portion having a plurality of openings to allow circulation of the viscous fluid in the chamber, and an annular axially extending hub portion 36e extending rightwardly and leftwardly of flange or bridge. The inner periphery of clutch hub portion 36e includes splines 36f which co-act with splines 29b on the outer periphery of sleeve 29 to effect rotation of clutch assembly 36 with output shaft 16 and allow limited sliding movement of hub 36e to effect axial movement of the coupling. A seal 38 prevents flow of transmission fluid along the interface of the sleeve and hub portions. Annular wear sleeves 40 and 41 of hardened steel are pressed onto the rightward and leftward outer peripheries of clutch hub portion 36e. The inner periphery of body hub portion 32g is journaled on the outer periphery of clutch hub portion 36e defined by sleeve 40. Sleeve 40 and clutch hub portion 36e include openings 40a and 36i defining a drain opening leading to passages defined by splines 36f and 29b for preventing buildup of high-pressure transmission fluid from the right side of the coupling.

Hub portion 32d is axially positioned with respect to clutch assembly 36 and inhibited against cocking due to nonuniform axial forces on body member 32 by thrust means 42 which react axial forces on body member 32 in both directions. The thrust means include an annular radially extending washer 44 formed from steel and axially secured against the rightward end of wear sleeve 40 by a snap ring 46 retained in an annular groove in clutch hub portion 36e and an S-shaped thrust washer 48. Thrust washer 48 is secured at its radially outer periphery against a radially extending surface 32i by a rollover 32h and extends radially inward to a position overlapping and sandwiching thrust washer 44 between its inner face and surface 32i with a relatively small running clearance therebetween.

Sleeve 40 and thrust means 42 function to absorb the entire bearing load of body member 32 and cover member 34, i.e., radial loads, uniform axial loads and nonuniform axial loads which tend to cock hub portion 32d on clutch hub portion 36e and reduce the critical spacing between working portions 32b and 36a on one diametrical side of the coupling and increase the critical spacing on the other diametrical side. This spacing is critical from a design standpoint since it determines the amount of viscous driving force or torque transmitted from body member 32 to clutch assembly 36. The described thrust means reduces the number of dimensions needed to set the spacing during assembly of the coupling and reduces the effect of nonuniform axial forces on the body member.

Nonuniform axial forces, which tend to cock body hub portion 32d on clutch hub portion 36e, are reacted at a position radially outward of the journal or radial bearing surfaces defined by the inner and outer peripheral bearing interface between the hubs. For example, should the connection of the outer peripheral portion 32a of the body member not be normal to the bearing interface between the hubs, one diametrical side of the body member will be pushed to the left and the other diametrical side will be pulled to the right. Any cocking of this nature accelerates wear of the journal or radial bearing surfaces and if severe enough causes axial and radial metal-to-metal contact of the rings in working portions 32b and 36a. Since the interface of thrust washers 44, 48 is disposed radially outward of the radial bearing surface, they in effect change or reduce the mechanical advantage of the nonuniform forces, thereby reducing the cocking forces on the radial bearing interface while holding the critical spacing between the working means. That is, should hub portion 32d tend to cock relative to hub portion 36e, the radially outer portion of washer 44 will contact portions of either surface 32i or washer 48 at a position radially outward of the journal and the seals.

With respect to reducing the number of dimensions needed to set the axial spacing between working portions 32b and 36a of the body member and the clutch assembly, the length of sleeve 40 and the running clearance between thrust washers 44, 48 set the minimum and maximum axial spacing. Further, since the running clearance is exterior of the coupling, this dimension is readily checked during assembly of the coupling and is lubricated at all times by the surrounding oil in the torque converter housing.

The radially outer peripheral portion 34a of cover member 34 defines a radially extending friction surface 34f which co-acts with a loose friction material or lining 58 sandwiched between a friction surface 22a defined by the torque converter housing 22. In copending patent application Ser. No. 388,557 the outer periphery of the steel cover member is disposed radially inward of an annular friction lining which is adhesively bonded to the aluminum body member. By extending steel cover 34 radially outward to define a clutching or friction surface, the bonding operation becomes unnecesary.

The radially outer peripheral portion 34a of cover member 34 may be extended and formed with a cylindrical wall portion that embraces the outer peripheral surface of the body member. The cylindrical wall may then be rolled down over the body member. Further, tangs 34b may be replaced by dimpling or rolling the cylindrical wall of the cover member into notches or recesses formed in the body member.

The viscous coupling is filled with a silicone fluid, for example, dimethyl polysiloxane. The silicone liquid is prevented from escaping radially outwardly by the previously mentioned elastomeric square cut sealing ring seal 33. The silicone fluid is prevented from escaping radially inwardly by a pair of double lip elastomer seals 54, 56. Seal 54 is positioned in an annular recess 32j in clutch hub portion 32d and runs against steel sleeve 40. Seal 56 is positioned in lip portion 34e and runs against steel sleeve 41. The seals also preclude leakage of automatic transmission fluid into the viscous coupling. If desired, sleeve 40 may be made in two shortened pieces, one pressed on hub portion 36e for sealing coaction with seal 54 and the other pressed into the bore defined by the inner periphery of hub portion 32d.

In the operation of the bypass drive line 27, automatic transmission fluid is normally admitted to the torque converter environment through the annular passage or chamber 60 formed between cover 34 and torque converter housing 22. The presence of the fluid in chamber 60 acting against cover 34 moves the viscous coupling to the right against a relatively light force provided by a spring 62 as viewed in FIG. 2 to its disengaged position (see in FIG. 1) wherein lining 58 is separated from housing surface 22a and surface 34f of the cover member to form an annular passage past the lining. The fluid thus flows radially outwardly in passage or chamber 60, past lining 58, and into the main chamber of the torque converter. When it is desired to engage the bypass drive line, as, for example, when the vehicle is operating in a higher gear ratio and above a predetermined vehicle speed, the direction of flow of the automatic transmission fluid in the torque converter is reversed by actuation of a suitable solenoid valve, not shown. Specifically, the automatic transmission fluid is now admitted to the main chamber of the torque converter where it acts against body 32 and slides the viscous coupling to the left as viewed in FIG. 2, to bring lining 58 into frictional engagement with housing and cover member surfaces 22a and 34f. The transmission now drives directly through the viscous coupling to output shaft 16, thereby bypassing the torque converter. Although there is a limited amount of slip in the viscous coupling occurring between body 32 and clutch 36, this slippage is significantly less than the slippage in the torque converter so that the overall efficiency of the transmission is significantly increased with corresponding improvements in vehicular fuel economy. And the viscous coupling, because of its cushioning effect, has the effect of eliminating the drive line vibrations that are transmitted to the passenger compartment in prior art bypass drive lines employing a solid mechanical driving connection. Overheating of the transmission fluid, when the viscous coupling is frictionally engaged with the torque converter housing, is prevented by allowing cooling oil to flow through an axially extended opening 64 disposed radially inward of lining 58.

In some automatic torque converter transmissions, clutch assembly 36 may connect to a shaft which bypasses the torque converter wherever the transmission is shifted into some predetermined ratio or ratios. Accordingly, the friction clutch may be dispensed with and the outer peripheral portion of the viscous coupling may then be mechanically connected to the torque converter housing.

The disclosed viscous coupling design provides simple, efficient transmission of power through the viscous coupling. Further, couplings of this design are readily formed and assembled with relatively low mass-production costs while still providing uniform torque transmitting capacities and long life in use even when subjected to nonuniform axial forces when they are frictionally or mechanically connected to torque converter housings.

While a preferred embodiment of the invention has been illustrated and described in detail, it will be apparent that various changes and modifications may be made in the disclosed embodiment without departing from the scope or spirit of the invention.

What is claimed is:

1. In a viscous coupling of the type including an annular housing assembly adapted to be positioned within the housing of a fluid coupling and defining an annular chamber containing a viscous fluid, the fluid coupling housing having an annular friction surface adapted for clutching coaction with the annular housing; an annular clutch assembly disposed in the chamber including an axially extending hub portion adapted for rotational driving and sliding connection to a shaft in the fluid coupling housing and an annular radially extending clutch portion having working means for viscous clutching coaction with a corresponding working means on a confronting portion of the annular housing;

seal means cooperating between the annular housing and the clutch hub portion; the improvement comprising:

first and second radially extending annular side wall members forming said annular housing and defining said chamber, said first side wall member formed of aluminum and having an annular axially extending hub portion at its radially inner edge journaled on the outer peripheral surface of the clutch hub portion, said side wall hub portion and said clutch assembly providing the sole radial and axial support for the housing assembly, and said second side wall member being formed of a ferrous metal having an annular radially extending portion at its outer periphery fixed to an outer peripheral portion of the first side wall member and defining an annular clutching surface for said clutching coaction with said annular friction surface of said fluid coupling housing.

2. The viscous coupling of claim 1, wherein said outer pheripheral portions of said first and second side wall members are fixed together by a metal rollover, and circumferential slippage of said members is prevented by a projection from one of said members into a recesse in the other member.

3. The viscous coupling of claim 2, wherein said projections and recesses comprise:
blind openings in the outer peripheral portion of said first side wall member; and
tangs defined by said second side wall member and received in said blind openings.

4. The viscous coupling of claim 1, wherein said journal is axially spaced from the annular radially extending clutch portion and said said seal means includes a seal disposed therebetween.

5. The viscous coupling of claim 4, wherein said clutch hub portion includes a drain opening extending radially inward from an edge of said journal to a passage extending axially in the direction of the second side wall member.

6. The viscous coupling of claim 1, further including:
thrust means reacting axial forces on said first side wall member for inhibiting changes in the axially spaced distance between said working means.

7. The viscous coupling of claim 6, wherein said thrust means includes:
a first thrust member extending radially outward from the inner edge of and contacting a radially extending surface of said clutch hub portion of said first side wall member for preventing axial movement of said hub portions relative to each other; and
a second thrust member having a radially outer edge fixed to said first side wall member at a position radially outward of the radially outer edge of said first thrust member and extending radially inward to a position overlapping and sandwiching said first thrust member between said radially extending surface of said one side wall member and said second thrust member.

8. The viscous coupling of claim 6, wherein said seal means includes first and second seals axially disposed on opposite sides of said clutch portion, said first seal disposed between a radially inner surface of said first side wall member and the outer peripheral surface of the clutch hub portion, and said second seal disposed between said lip portion of said second side wall member and the outer peripheral surface of said clutch hub portion; said clutch hub portion includes with respect to said chamber an axially outwardly facing end surface, an annular inwardly facing recess supporting said first seal and said journal disposed therebetween; and wherein said thrust means includes:
a first thrust member extending radially outward from the inner edge contacting said end surface, and axially fixed with respect to said clutch hub portion; and
a second thrust member having a radially outer edge fixed to said end surface at a position radially outward of the radially outer edge of said first thrust member and extending radially inward to a position overlapping and sandwiching said first thrust member between said end surface and said second thrust member.

9. The viscous coupling of claim 6, wherein said hub portions are principally formed of aluminum, said outer peripheral surface of said clutch hub portion is defined by a ferrous metal sleeve pressed on said clutch hub portion for providing bearing surface for the hub portion of said one side wall member and for providing a wear surface of said first seal.

10. The viscous coupling of claim 6, wherein said thrust means includes portions disposed radially outward of said seal means for inhibiting said cocking.

* * * * *